(12) United States Patent
Honnell

(10) Patent No.: US 7,637,485 B2
(45) Date of Patent: Dec. 29, 2009

(54) PACKING FOR COLUMN

(76) Inventor: Marvin A. Honnell, 12116 Kensington Ave., Hayden, ID (US) 83835

( * ) Notice: Subject to any disclaimer, the term of this patent is extended or adjusted under 35 U.S.C. 154(b) by 487 days.

(21) Appl. No.: 11/363,550

(22) Filed: Feb. 27, 2006

(65) Prior Publication Data

US 2006/0202364 A1    Sep. 14, 2006

Related U.S. Application Data

(63) Continuation-in-part of application No. 10/703,976, filed on Nov. 7, 2003, now Pat. No. 7,014,175.

(51) Int. Cl.
 *B01F 3/04* (2006.01)
(52) U.S. Cl. .................. 261/95; 261/DIG. 72
(58) Field of Classification Search .......... 261/94, 261/95, DIG. 72
See application file for complete search history.

(56) References Cited

U.S. PATENT DOCUMENTS

| | | | | |
|---|---|---|---|---|
| 3,543,937 A * | 12/1970 | Choun | .................. | 210/150 |
| 3,758,087 A * | 9/1973 | Hoon, Jr. | .................. | 261/94 |
| 3,823,924 A * | 7/1974 | Hoon, Jr. | .................. | 261/94 |
| 3,924,807 A * | 12/1975 | Morgan | .................. | 239/55 |
| 4,197,264 A * | 4/1980 | Degg | .................. | 261/98 |
| 5,458,817 A * | 10/1995 | Lang | .................. | 261/94 |
| 5,637,263 A * | 6/1997 | Lang et al. | .................. | 261/94 |
| 6,245,230 B1 * | 6/2001 | Ricci | .................. | 210/232 |
| 6,631,890 B1 * | 10/2003 | Lau | .................. | 261/94 |
| 6,811,147 B2 * | 11/2004 | Lau et al. | .................. | 261/95 |
| 7,014,175 B2 * | 3/2006 | Honnell | .................. | 261/94 |
| 2004/0041284 A1 * | 3/2004 | Lau et al. | .................. | 261/94 |

FOREIGN PATENT DOCUMENTS

WO    WO89/05688    *    6/1989

* cited by examiner

*Primary Examiner*—Scott Bushey
(74) *Attorney, Agent, or Firm*—Harish Dhingra; Dhingra & Associates

(57) ABSTRACT

Packing elements typically used in columns to enhance chemical reactions are illustrated. The packing element may be shaped as a sphere, ellipsoid, any shape of a revolution of a conic, and made of polygonal elements of various numbers of sides. Alternate embodiments illustrated may have faces analogous to crystal shapes, or large number of sides of same or variable dimensions. The packing elements have various shapes of drip points. The construction of the element is such that pieces can be folded thus saving assembly time and cleaning time.

42 Claims, 11 Drawing Sheets

FIGURE 1B   SECTION A-A

PACKING FOR COLUMN

CROSS-REFERENCE TO RELATED APPLICATIONS

This application is a continuation in part of application having Ser. No. 10/703,976 filed Nov. 7, 2003 of which the applicant is the sole inventor. This application issued as U.S. Pat. No. 7,014,175.

STATEMENTS REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

1. Field of the Invention

The present invention generally relates to chemical processes and more particularly to packings in columns.

2. Description of the Related Art Column packing is used in the chemical, environmental, and petrochemical industries. The packing elements are generally used to enhance chemical reaction throughput. Such column packing are generally divided into three classes, namely:

a) Random or dumped packing: These are discrete pieces of packing of a specific geometrical shape, which are dumped or randomly packed into the column shell.

b) Structured or systematically arranged packing: These are crimped layers of wire mesh or corrugated sheets. Sections of these packing are stacked in the column.

c) Grids: These are also systematically arranged packing, but instead of wire-mesh or corrugated sheets, these grid-packings use an open-lattice structure.

There are three generations of evolution in packing. An overview of the three generations of developments packing is provided in the related application Ser. No. 10/231,500.

One of the continuing challenges for improving the known art of packing design involves increasing the total available surface areas of the packing elements while maintaining the structural strength and improving fluid flow.

By increasing the surface area of packing, more liquid loading (in terms of gallons per minute per square feet) can be achieved, which in return can improve the reaction efficiency at the wetting surface of, for example, gas stream and liquid feed stream, as in the example of toxic gas scrubber process, or for liquid feed streams in a distillation column operation. However, increasing the surface area typically leads to increased resistance to the fluid flow which in turn decreases the throughput. On the other hand, cutting materials from the packing may increase the fluid flow but may reduce the structural strength of the packing, which may cause collapse of the elements and necessitate their replacement. Thus, design of the packing elements presents interesting mathematical challenges of competing problems of providing maximum contact area to improve reaction rates, maintain structural strength, and improve fluid flow.

In order to increase the surface area, the packing elements become more complex in geometrical shapes, resulting in more individual breakage, less structural rigidity, and more interlocking inside a CPI column. Thus, the challenge facing packing element technology is how to significantly increase the surface area without sacrificing the structural integrity of the individual packing.

The engineers persistently encounter the problem of carving out more space (for increased throughput) to produce more surface area (for increased reaction surface) from materials like metals or plastics because the operation will always weaken structural integrity. The more complex the geometrical shapes, the more surface area, and the damage to the structural integrity of the packing.

Therefore, it would be highly desirable to design geometrical shapes, which not only maximize reactants surface contact area, maintain structural integrity of the structure but also minimize pressure drop to enhance the throughput of the apparatus. It is also desirable to design geometries that would prevent nesting by eliminating sharp protrusions that may be damaged in loading the apparatus. Yet another desirable characteristic would be to design the geometry that would provide easy removal of the packing from tower columns for periodic cleaning. Still another desirable characteristic would be easy element assembly to sufficiently reduce assembly time and reduce corresponding cost.

BRIEF SUMMARY OF THE INVENTION

In one aspect, this invention relates to random or dumped packing element. One embodiment of the element has two segments of an apertured revolution of a conic and a middle section. The two halves and the middle section can be folded to assemble the packing element. The three parts of the element may be connected by living hinges to facilitate easy assembly for use as well as easy removal and opening for cleaning and other necessary operations. In another embodiment the two halves and the middle section have drip points on the middle section. In yet another aspect, a packing element is made of foldable segments formed from polygons. Any number of segments of polygonal structures can be made into a packing element also having drip points. The illustrated embodiments have four segments but any number of segments of varying dimensions may be connected together to form packing elements. The drip points may be advantageously placed on any suitable locations in the element. In another embodiment the packing element may like crystalline faces with drip points so as to be suitable for various applications. A method of making the elements by molding process involves pouring suitable material in the mold and extracting an element having three or more connected parts.

BRIEF DESCRIPTION OF THE SEVERAL VIEWS OF THE DRAWINGS

A better understanding of the present invention can be obtained when the following detailed description of some embodiments is considered in conjunction with the following drawings in which.

DETAILED DESCRIPTION OF THE INVENTION

Figure 1A:
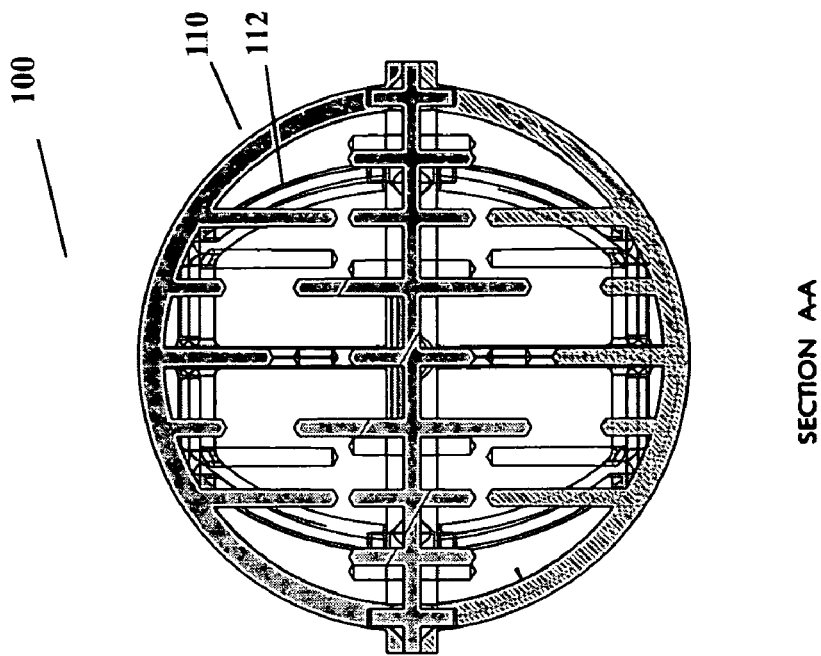
FIG. 1: is the end view of an example embodiment of a packing element folded into a sphere shape from the three continuous sections wherein all sides look the same and are equal because all sides are geometrically progressive.
Figure 1:
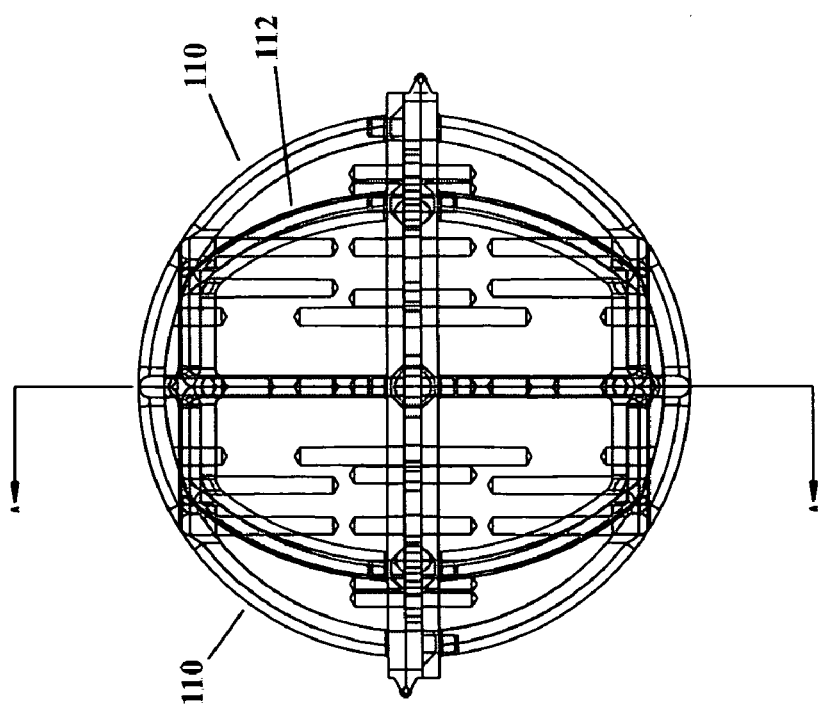
Figures 2, 2A, 2B:
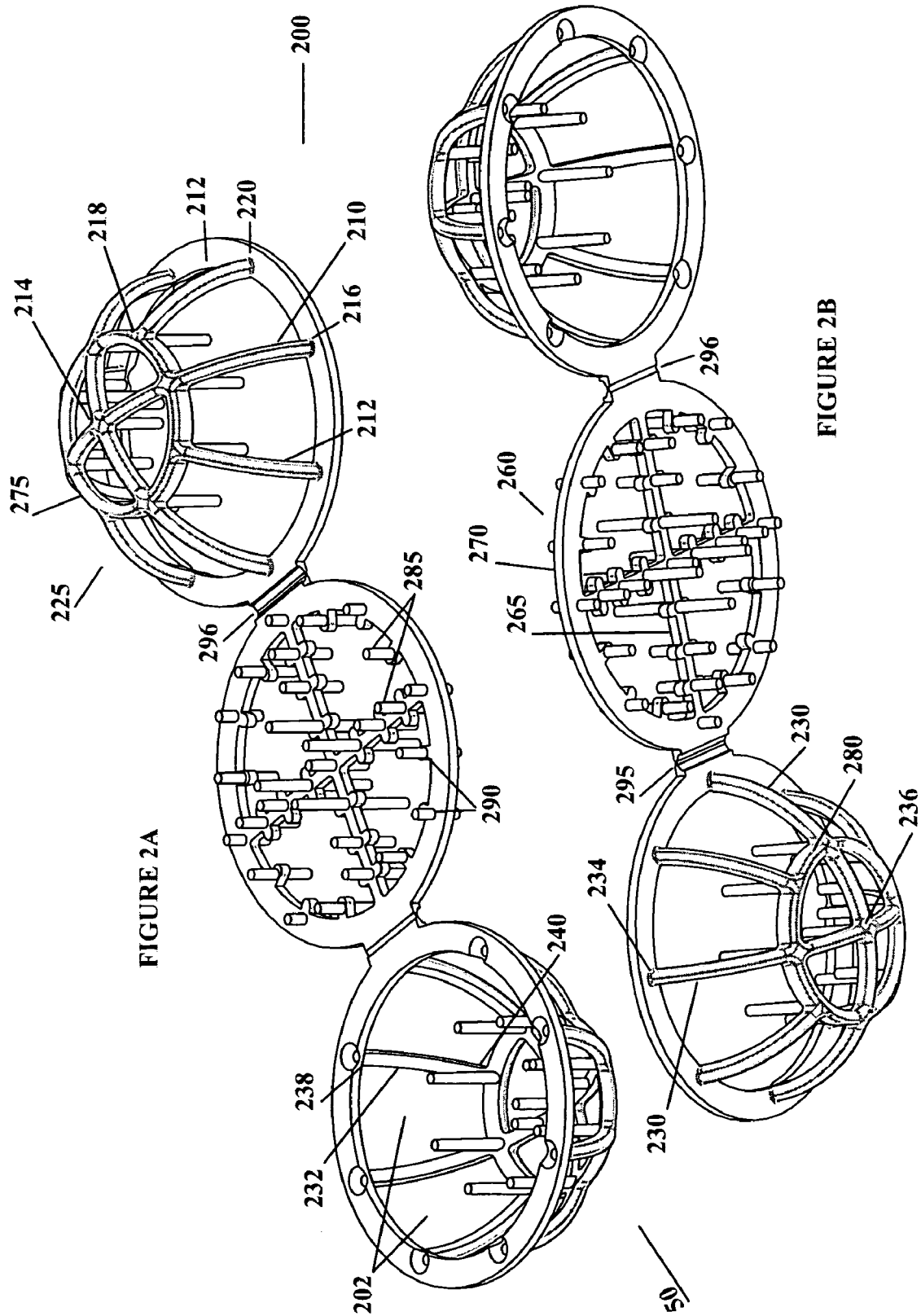
FIG. 2: is the Isometric view of an example embodiment of a continuous piece of three sections that are tied together without interruption creating two half spheres and one center section which when assembled become packing element of FIG. 1.

With reference to FIGS. 1 and 2 show an end view and a sectional view of an example embodiment of a packing element 100 is illustrated. The packing element has a plurality of ribs 110, 112, 210, 212, 218, 230, 232, and 280. In general, the ribs can be connected to form two segments of a shell of a revolution of a conic section. Although segments 225 and 250 are shown as segments of a sphere, it is possible to make two segments by cutting the shell at an angle from the major plane or the minor plane of the shell. The cutting may be along a plane of a conic section or other cuttings like zigzag cutting may be employed. Such variations would be apparent to those skilled in the art. A conic section structure 260 is connected to the two segments so that the two segments and the conic section structure can be folded to make a packing element 100. The conic section shown is circular but other shapes will result if the two segments are formed by cutting the shell of revolution at different angles as mentioned above. The conic section structure may be reinforced by reinforcing ribs. The reinforcing ribs may be positioned like spokes, like a mesh, nearly parallel to each other, or crisscrossing each other at one or more angles.

Still referencing FIGS. 1 and 2, the packing element has a first plurality of external ribs 110, 112, 210, 212. Each of the external ribs has a first end 218 (e.g. for external rib 210), and a second end 220 (e.g. for external rib 210). The first plurality of external ribs is longitudinally spatially positioned and connected together at their first ends (i.e. north pole) and is further connected together at their second ends (i.e. for example equatorially spaced) to form a first half 225 of a ribbed shell 100 of a revolution of a conic section. The ribbed shell may be a sphere, ellipsoid, section of a paraboloid, or section of a hyperboloid branch. The second ends may be connected by a thin wire or may be by a simple ring integrally connecting the second ends. Similarly, a second plurality of external ribs 130, 132, 230, 232, each rib has a third end 236 (e.g. for external rib 230) and a fourth end 238 (e.g. for external rib 230). The second plurality of the external ribs are likewise longitudinally spatially positioned and connected together at their third ends (i.e. south pole) and connected together at their fourth ends to form a second half 250 of a ribbed shell of the revolution of a conic section in an analogous fashion to the first half. A spoked conic section structure 260 comprising a plurality of radial ribs 265 which are connected to a ring 270 so that the spoked conic section structure fits between the first half and the second half of the ribbed shell to form the packing element. The shape of the spoked conic section depends on the selected shape of the first half and the second half of the ribbed shell. Thus, the packing element defines a plurality of apertures through which the reacting fluids can freely flow and mix to promote chemical reactions.

In an alternative embodiment, the packing element further includes at least one first latitudinal rib 275 in the first half. In this embodiment the first end of at least one of the first plurality of external ribs terminates to connect at the at least one first latitudinal rib. This configuration further provides additional strength to the structure and also creates additional aperture space that facilitates throughput. In a similar fashion, the packing element may further have at least one second latitudinal rib 280 in the second half. Also, in this configuration the third end of the at least one of the first plurality of external ribs terminates to connect at the at least one second latitudinal rib. Those skilled in the art would be able to add additional latitudinal ribs and generate numerous combinations of connecting the external ribs to the latitudinal ribs.

In any embodiment of the packing element the external ribs and the radial ribs need to have sufficient cross section to be able to withstand external loads due to fluids based on particular application. Further, the external ribs may comprise rods having various different cross-sections to facilitate fluid flow as well as provide fluid surface area for enhancing reactions. For example, the cross section may be circular, oval, rectangular, triangular and other variations thereof as would be evident to those skilled in the art. Further, the ribs may be straight or be twisted and/or may have grooves to provide additional surface area to enhance reactions.

In a still another embodiment the radial ribs further include drip points 285. These drip points may be attached separately or may be fabricated integrally with the radial ribs. As illustrated, the drip points in FIGS. 1 and 2 are shown emanating inwardly in the packing element which are perpendicular to latitudinal planes. However, those skilled in the art may vary the directions of drip points as emanating towards the focal points or other combinations thereof. The drip points may have cross section that is circular, elliptical, triangular, rectangular or other combinations which those skilled in the art may easily conceive of. Further, the ring may further comprise drip points 290. Although, FIGS. 1 and 2 illustrate a spherical packing element, one may construct packing elements which are shaped as other revolutions of conic sections. In other embodiments the radial ribs of the packing element may have drip points. Likewise, the drip points may be placed at any of the interior surfaces.

In the packing element, the first half and the second half are coupled to the spoked conic section structure to enable folding to make the packing element. In the embodiment illustrated in FIGS. 2A and 2B, the first spherical half and the second spherical half are connected with the spoked wheel like structure. In one embodiment the first half and the second half are coupled to the spoked conic section structure by living hinges 295 and 296 to enable folding to make the packing element. The living hinges allow easy assembly of the element by eliminating the need for alignment of the pieces. This feature saves considerable operator time in assembling and opening the element for cleaning the elements.

Figure 3:
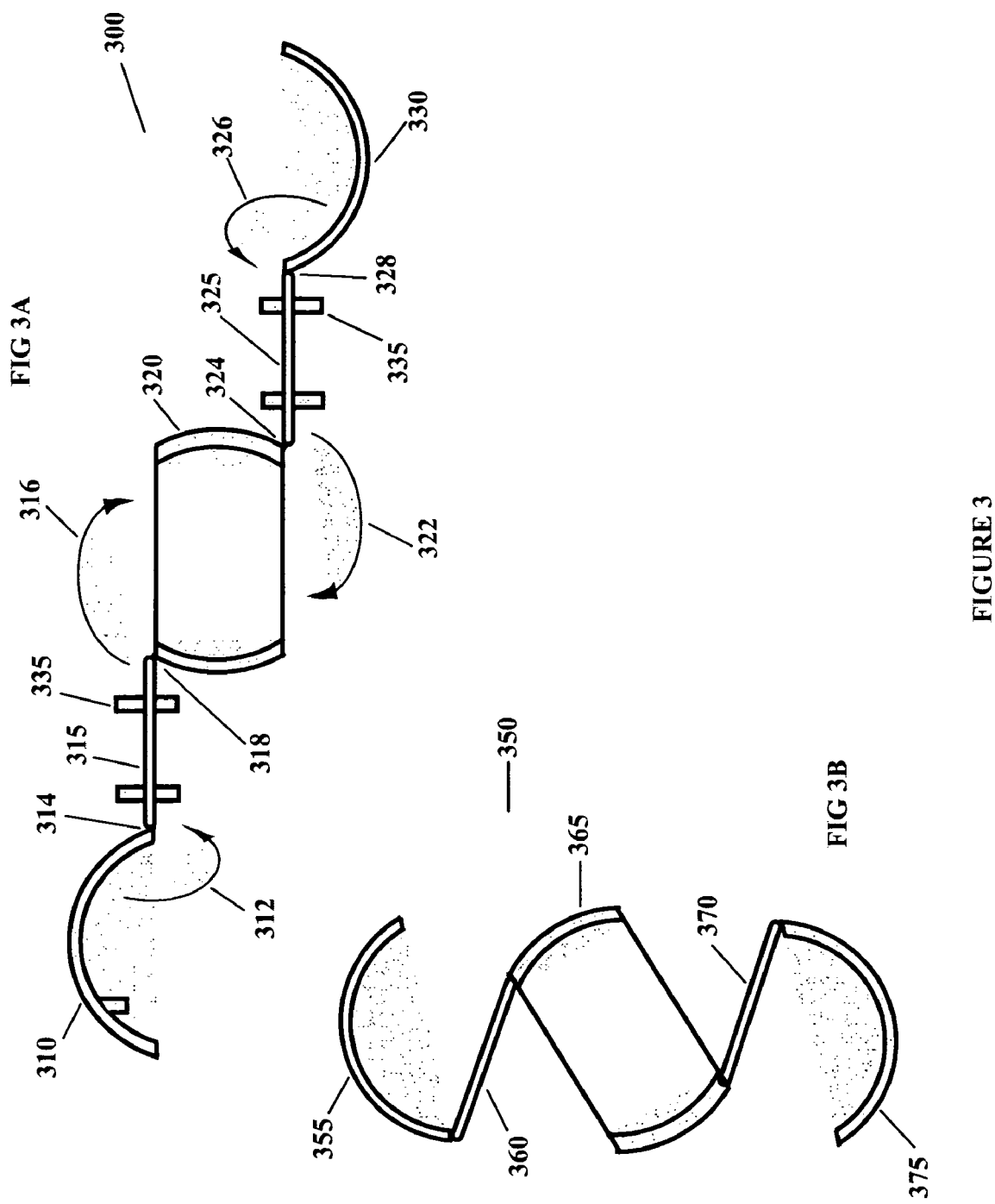
FIG. 3: shows examples of how multi-pieces could be designed to obtain packing element of FIG. 2.

With reference to FIG. 3A, in a yet another embodiment, the entire element 300 may be constructed as a five-piece element which when folded becomes the whole element. The embodiment illustrated in FIG. 3A has a segments shown as 310, 315, 320, 325, and 330. The example respective directions for folding the five elements are indicated by arrows marked 312, 316, 322, and 326. Obviously, there are many variations for folding the segments of the element. The segments may further be connected, for example, by living hinges 314, 318, 324, and 328. There may be drip points 335 positioned on any of the segments.

With reference to FIG. 3B, in a still another example embodiment, the entire element 350 may be constructed as a five-piece element which when folded becomes the whole element. The embodiment illustrated in FIG. 3B has a segments shown as 355, 360, 365, 370 and 375. Again folding the segments is obvious where any suitable connection may be used to join the segments and drip points may be suitably provided.

It is worth noting that the above embodiments of the element have up to about ninety eight percent void space in which considerable surface is provided for reactants to come in contact with each other. Also, fluid flow is facilitated by various features of the design of the embodiments.

Figure 4:
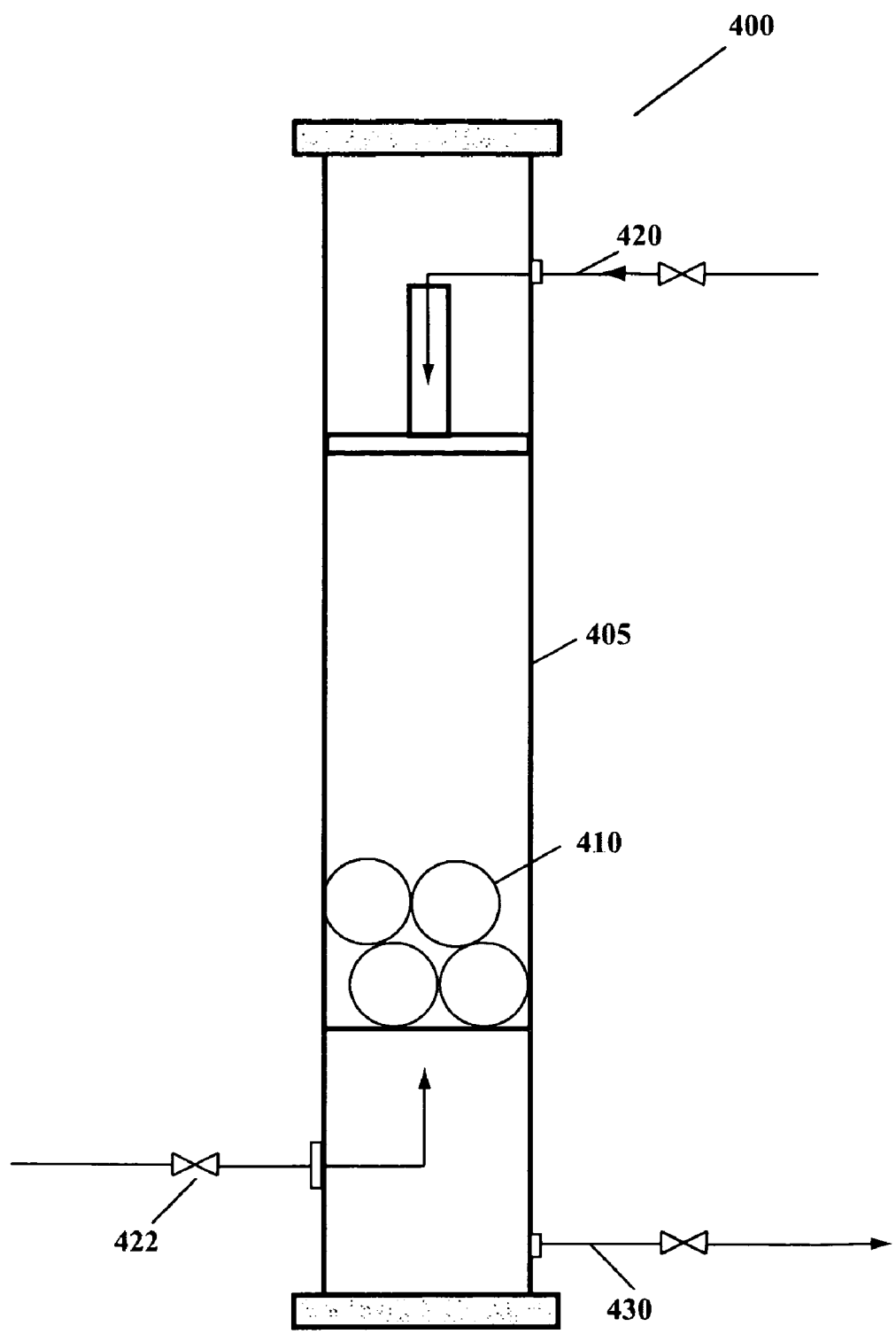
FIG. 4: is an example system of a column in which packing element of FIG. 2 is used.

With reference to FIG. 4 a system 400 for utilizing the packing element is illustrated. The system has a column 405 in which at least one packing element 410 is packed. However, generally a plurality of packing elements is packed depending on specific application. The packing element of FIGS. 1 and 2 have been described in the previous paragraphs. Typically, a column has at least one inlet port 420 for one reacting fluid, a second inlet port 422 for a second reacting fluid, and at least one outlet port 430 for discharging the output. The column may have different combinations of inlet ports and output ports based on specific application.

Typically, the system 400 is used for enhancing chemical reaction between two or more fluids, for example one of the fluids may be gaseous and the other fluid may be in a liquid form. The gaseous fluid is generally injected from lower input port 422 and the liquid is typically injected into the input port 420 so that the reacting fluids have enhanced surface area substantially provided by the packing elements over which the fluids interact where the packing element provides least obstruction to the fluid flow. Generally, the output of the reactions is discharged from the port 430 which is positioned according to the state of the final product e.g. a liquid or a gas. The packing elements may be arranged in a structured packed manner or in a random packed fashion.

Figure 5:
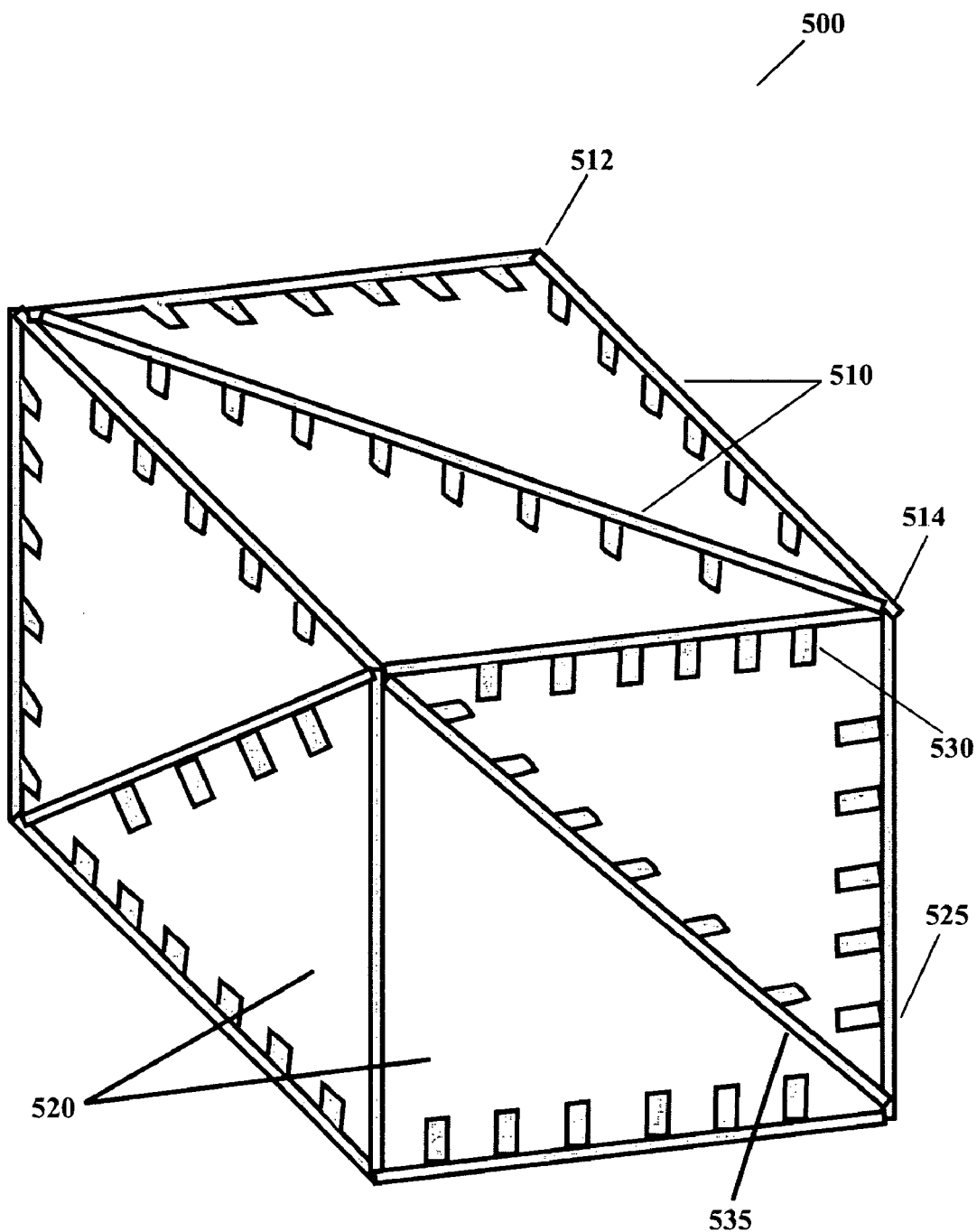
FIG. 5: is an isometric view of an alternative shape of packing element based on design of the invention.

With reference to FIG. 5, an alternate embodiment of a packing element 500 is illustrated. A plurality of external ribs 510 in which each rib has a first end 512 and a second end 514 (e.g. for rib 510). The first plurality of external ribs form a plurality of lattice faces 520. The plurality of lattice faces is coupled to form a crystal-faced structure 525 with apertures to form a packing element. Further, at least one rib has at least one drip points 530. The lattice faces may be further structurally strengthened by connecting the appropriate nodes of the lattice face by additional ribs 535. Thus, the lattice face may be any valid crystal face; a packing element may be constructed.

Figure 6:
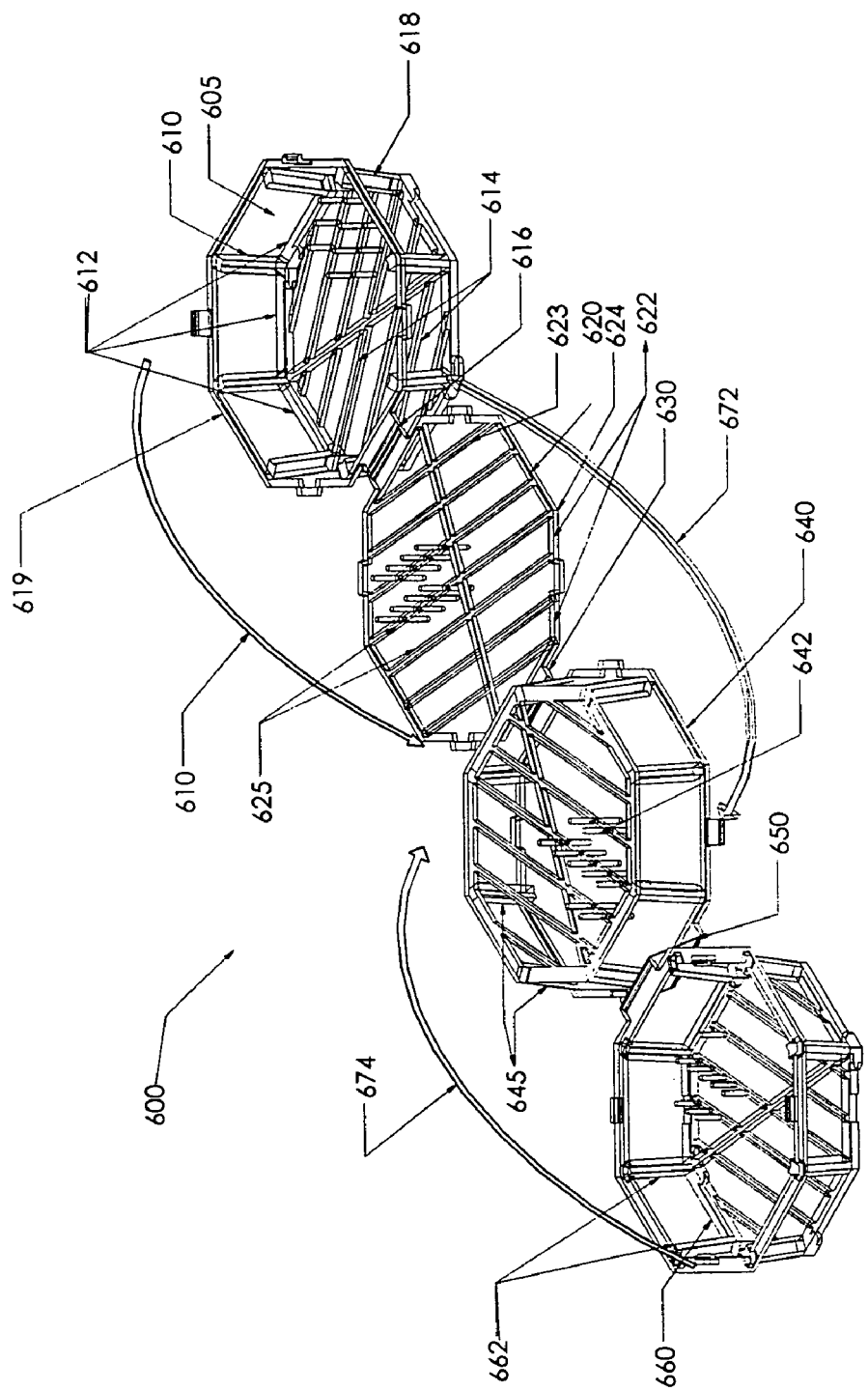
FIG. 6: is an exploded isometric view of an example embodiment of a packing element having four segments showing foldability of the segments based on design of the invention.

FIG. 6 shows an exploded isometric view of a still another example embodiment of the packing element 600 having four segments, a first segment 610, a second segment 620, a third segment 640, and a fourth segment 660, showing foldability of the segments based on design of the invention. A first plurality of perimeter rods 612 (including others similarly situated) are connected to form a first polygon 605. In this embodiment ribs 614 are connected to perimeter rods to make segment 610 a sturdy structure. Likewise, it would be obvious to those skilled in the art to provide necessary number and locations of ribs to strengthen other segments of the packing element. Similarly, a second plurality of perimeter rods 622 is connected to form a second polygon 624 and at least one second rib 623 is optionally connected to two sides of the second polygon 624 to form a second segment 620. Similar to the structure of the first segment, the second segment may be strengthened with necessary number of ribs. The first segment and the second segment are provided with a connector 616. The connector 616 may be integrally manufactured with the first and second segment or may be provided with other latch like structure. The connector facilitates folding of the first segment and the second segment to form the packing element. Additionally, segment two shows drip points 625. Drip points may be suitably provided in any of the segments to facilitate increasing fluid dripping time and increasing surface area of the fluid exposure when in usage. Such positioning and sizing of the drip points would be within the skill of those practicing the art. A first sub-polygon 619 parallel to the polygon forming the first element may be optionally connected to the polygon forming the first element with spacer-ribs 618. In the illustrated embodiment a third segment 640 and a fourth segment 660 are connected together in the manner described for the first segment and the second segment to form a four segment packing element. Likewise, packing element may be made out of as many segment as necessary. The third segment 640 is connected to the second segment 620 by a connector 630. Note that in this illustration, the second segment does not have any spacer-ribs while the third segment has spacer-ribs 645 and the fourth segment 660 has spacer-ribs 662. The third segment and the fourth segment are connected by the connector 650. In the illustrated embodiment, the first segment is folded on to the second segment according to directional arrow 670, the fourth segment is folded on to the third segment according to directional arrow 674, and the third segment is folded onto second segment according to directional arrow 672, to form the packing element.

Figure 7:
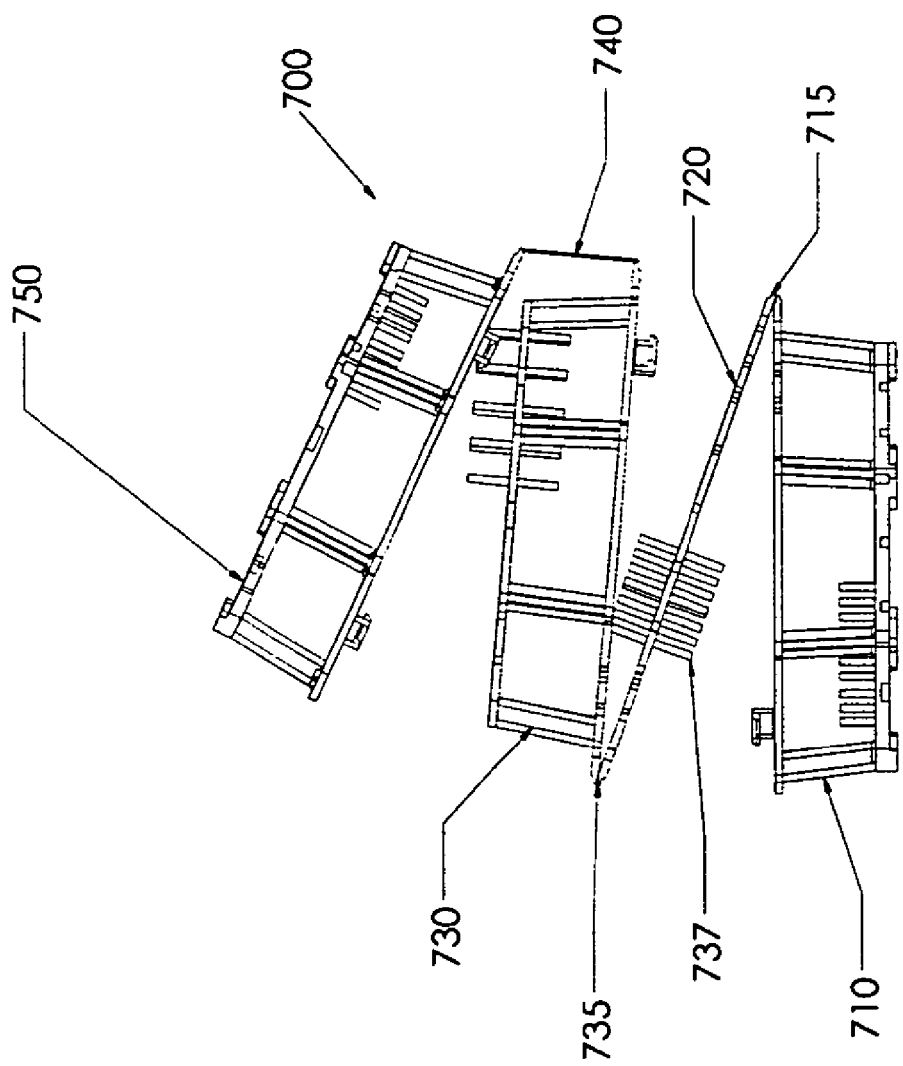
FIG. 7: is an exploded isometric view of the example embodiment of the packing element having four segments showing partially folded segments of the packing element of the embodiment of FIG. 6.

FIG. 7 is an exploded isometric view of the example embodiment of the packing element 700 having four segments showing partially folded segments of the packing element of the embodiment of FIG. 6. The first element 710 is connected to the second segment 720 by a connector 715. Likewise, the second segment 720 is connected to the third segment 730 by a connector 735, and the third segment 730 is connected to the fourth segment 750 by a connector 740. For illustration purposes, connectors 715 and 735 are shown different from connector 740. Those skilled in the art may easily incorporate different types of connectors in the packing element. Drip points 737 may be positioned in any and all segments of the packing element.

Figure 8:
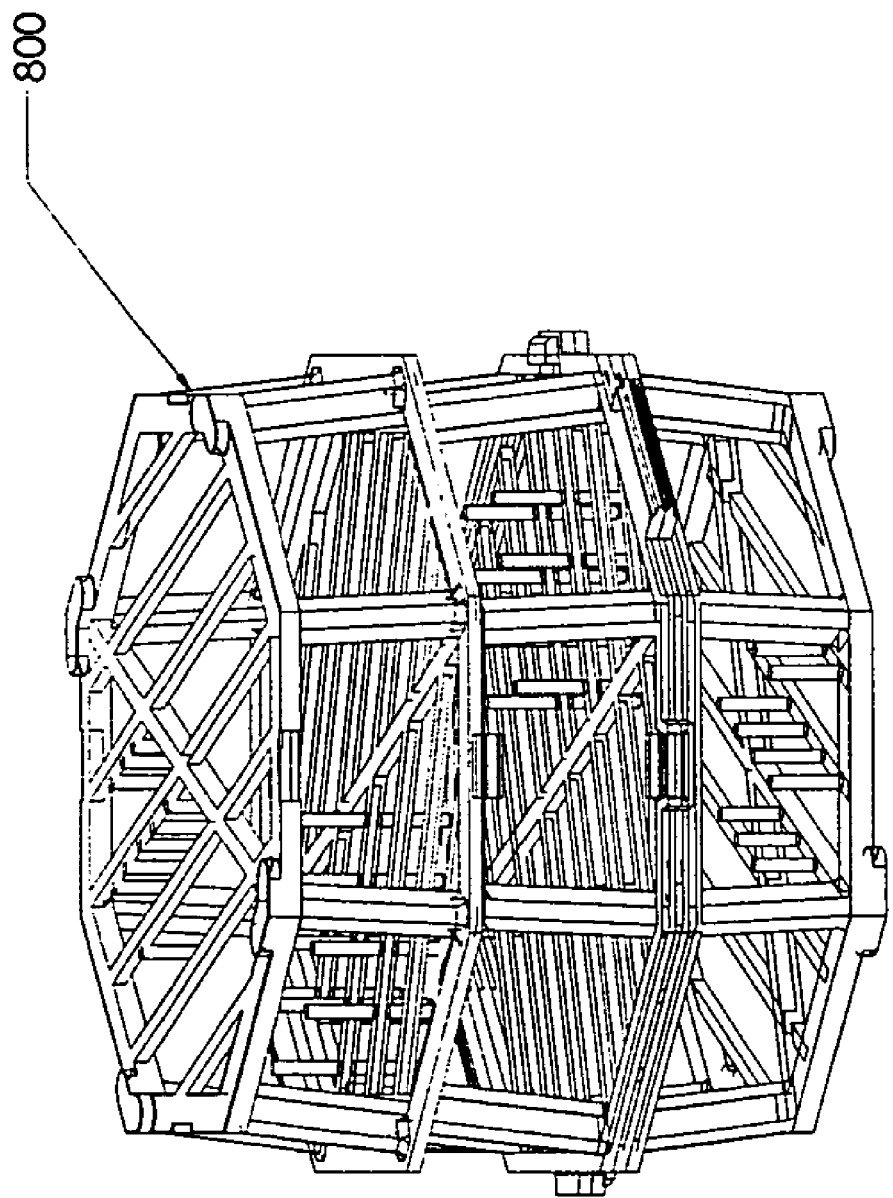
FIG. 8: is an isometric view of the fully folded example embodiment of the packing element of FIG. 6.

FIG. 8 is an isometric view of the fully folded example embodiment of the packing element 800 of FIG. 6.

Figure 9:
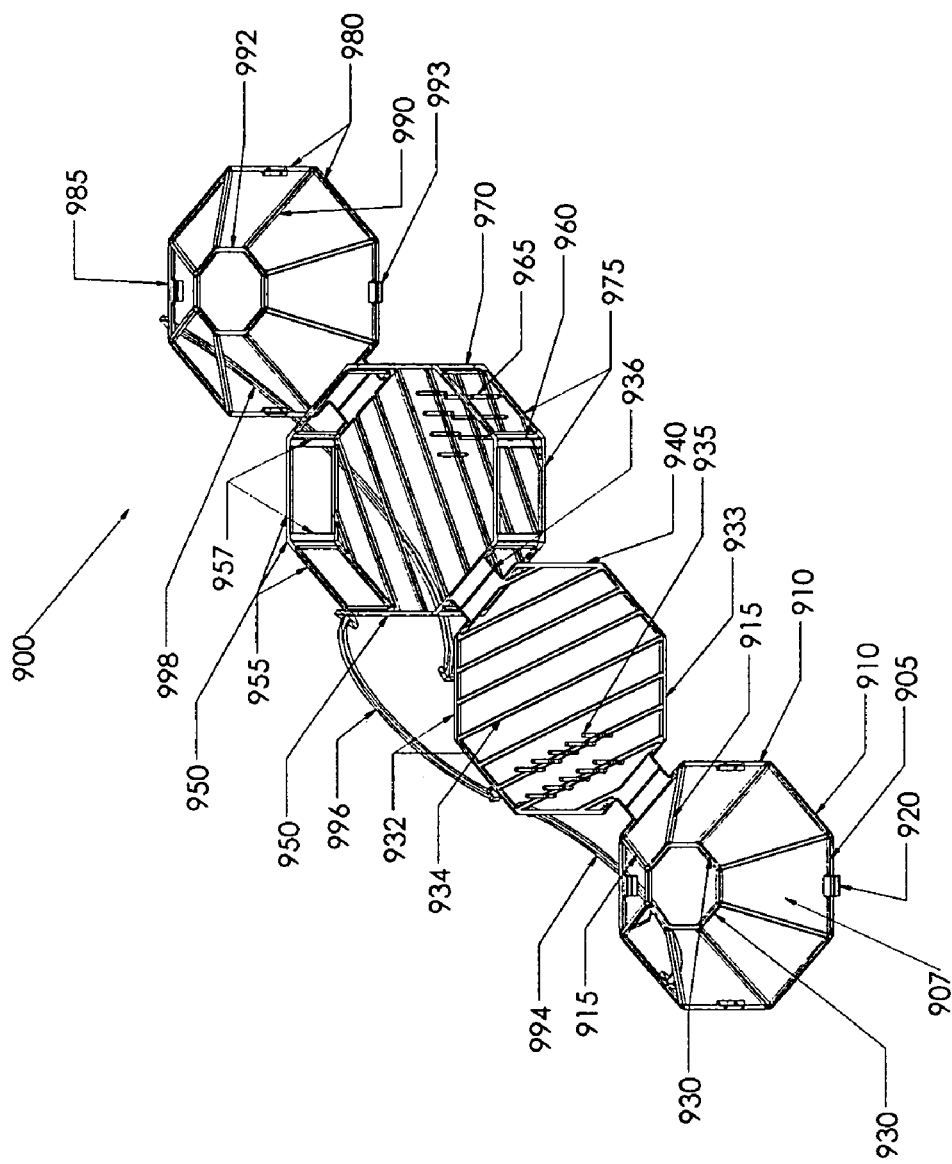
FIG. 9: is an exploded isometric view of another example embodiment of a packing element having four segments showing foldability of the segments where two of the segments form frustum of a octagonal conical segment, one of the segment forms segment of an octagonal cylindrical segment and another segment is a octagonal planer segment based on design of the invention.

FIG. 9 is an exploded isometric view 900 of another example embodiment of a packing element having four segments showing foldability of the segments where two of the segments form frustum of an octagonal conical segment, one of the segment forms segment of an octagonal cylindrical segment and another segment is a octagonal planer segment based on design of the invention. In this example embodiment 900 a first plurality of perimeter rods 910 forms the first polygon of the first segment 905 and a second plurality of perimeter rods 932 forms a first polygon of the second segment 940. The second element has drip points 935. The drip points may be included in any of the segments of the packing element. The first element and the second element are connected by a connector 920 to enable folding of the first element and the second element to form the packing element. At least one second rib 933 is connected to two sides of the perimeter rods of the second element. In the illustrated embodiment, the packing element has a first segment 905, a second segment 940, a third segment 960, and a fourth segment 985. The first segment has a first plurality of perimeter rods 910 to form a first polygon 907. A first sub-polygon 930 that is congruent to the first polygon but is smaller than the first polygon and is connected to the first sub-polygon by a plurality of cross-ribs 915. Easily the first sub-polygon may be of smaller or greater dimensions than the first polygon. There is a connector 920, which in this case is a latch to connect the first segment and the second segment. As shown, the plane of the first sub-polygon is parallel to the plane of the first polygon but it may be set at other angular positions. The second segment is formed by a second plurality of perimeter rods 932 that form the second polygon 933. Each of the second plurality of ribs 934 is connected to two perimeter rods. The second segment shows drip points 935. The drip points may be put in any of the segments. A connector 936 connects the second segment and the third segment. Likewise, the third segment 960 has a third plurality of perimeter rods 975 to form a third polygon 970. A third sub-polygon 950 is formed by a third plurality of perimeter rods 955. The third sub-polygon is connected to the third polygon by cross-ribs 957. Thus, the third element structure appears to be like a segment of a polygonal cylinder. The drip points 965 are positioned on the ribs of the third element. The connector for connecting the third element is hidden between the third element and the fourth element and its location would be obvious to those skilled in the art. A fourth plurality of perimeter rods 980 forms a fourth polygon 987. The fourth element is similar to the first element. The fourth segment 985 is formed by a fourth plurality of perimeter rods 980 that form the fourth polygon 987. A fourth sub-polygon 992 is attached to the fourth polygon by cross-ribs 990 where a frustum structure of a polygonal cone is formed. A connector 993 is provided to connect to the third element. Finally, arrow 994 shows folding of the first and the second segment, arrow 996 shows folding of the second and the third segment, and arrow 998 shows folding of the third and the fourth segment to make a packing element.

Still referring to FIG. 9, the packing element's segments are formed from octagonal elements. It should be noted that the octagons may be replaced by any dimensional polygons, and when the number of perimeter rods become very large (tend to infinity) the structure becomes circular (or elliptical if length of the perimeter rods is varied). Further, as shown herein, for example, the first element is formed with a first polygon and a firs-sub-polygon. Instead, the first element may be formed by any number of sub-polygons of varying dimensions to yield a segment of a sphere or a segment of an ellipsoid and other conic sections. Similarly, numerous shapes of varying complexity may be generated by varying dimensions of the polygons of the third element, varying number of sub-polygons, and varying number of elements.

Figure 10:
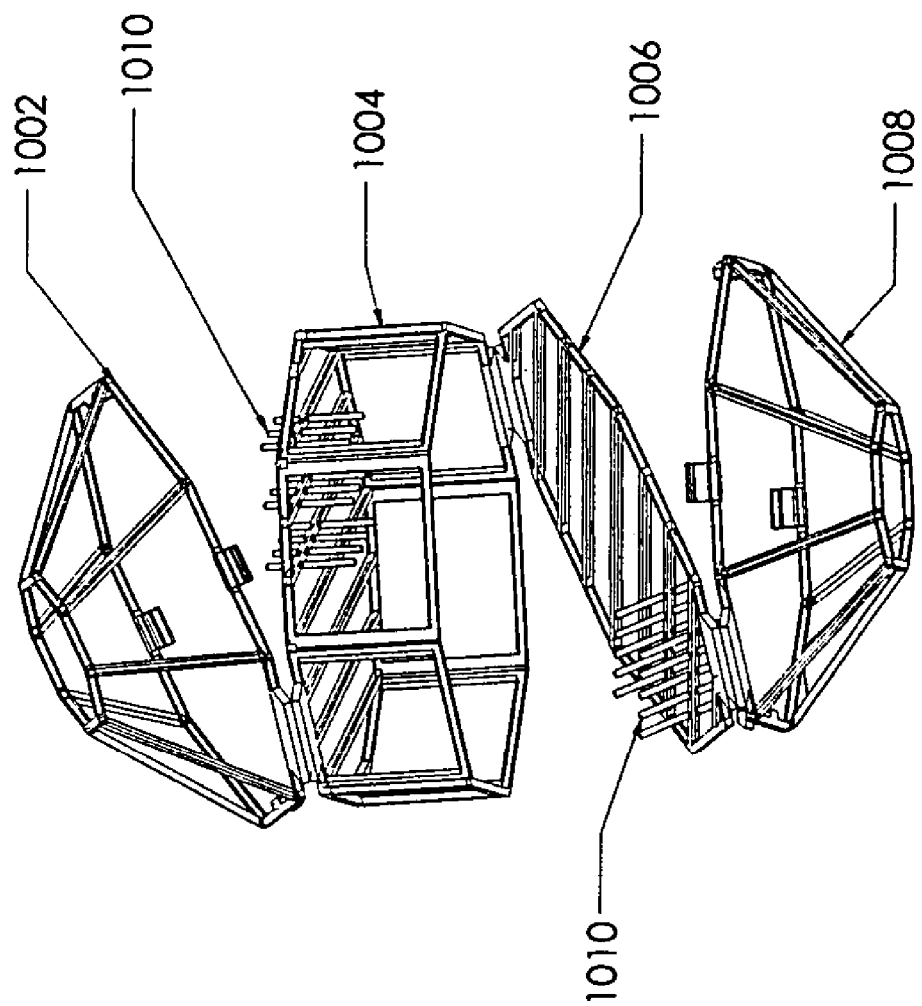
FIG. 10: is an exploded isometric view of the example embodiment of the packing element having four segments showing partially folded packing segments of the packing element of the embodiment of FIG. 9.

Now referring to FIG. 10 is an exploded isometric view of the example embodiment of the packing element 1000 having four segments, the first segment 1002, the second segment 1004, the third segment 1006, and the fourth segment 1008, showing partially folded packing segments of the packing element of the embodiment of FIG. 9. Some of the drip points 1010 are shown on the second segment and the third segment. All other features are the same as described above in context of FIG. 9.

Figure 11:
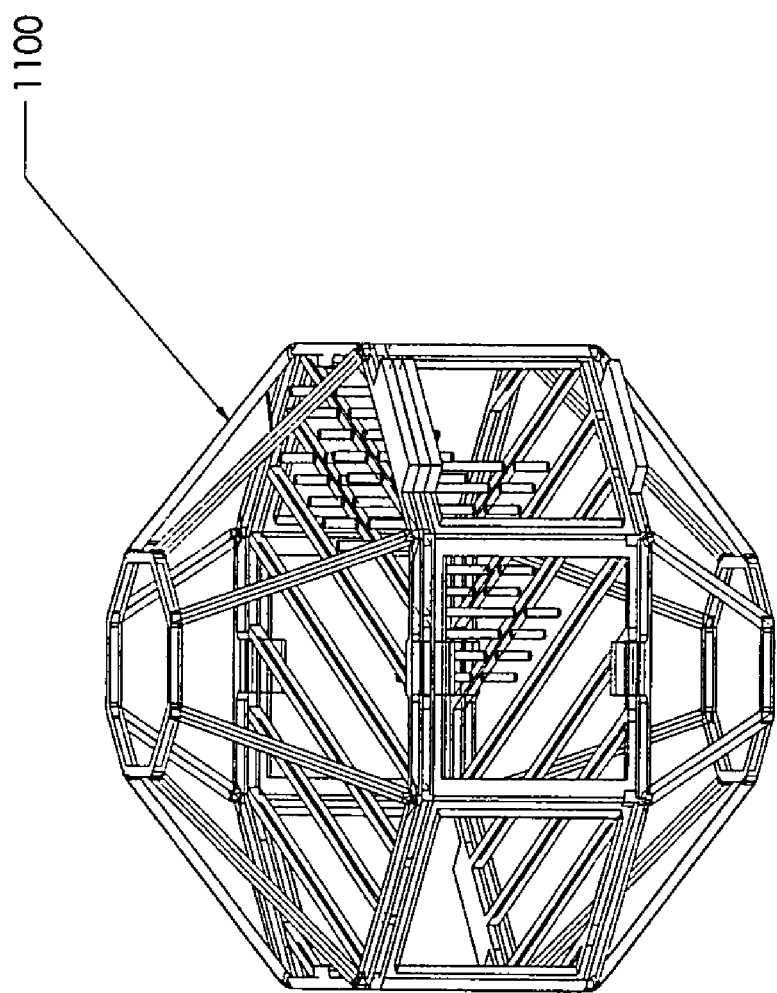
FIG. 11: is an isometric view of the fully folded example embodiment of the packing element of FIG. 9.

FIG. 11 shows an isometric view of the fully folded example embodiment of the packing element 1100 of FIG. 9.

It should be further noted that the objective of improving contact time of the fluids may be further improved by adopting different cross-sectional shapes and features in the perimeter rods, ribs, cross-ribs, drip points, and other structural components, for example, elliptical, rectangular, twisting structural components, providing grooves in the structural components and other similar aspects that would be obvious to those of skill in the art.

The method of making a packing element includes making a mold, wherein the mold comprises spaces to yield a packing element when filled with molten material. The technology of molding is well known to those skilled in the art. The details of the packing element have been already described with reference to FIGS. 1, 2, and 5-11. The material for molding operations may be any of the well-known resins that would be apparent to those skilled in the art and have been further indicated in the related application.

The foregoing disclosure and description of the preferred embodiment are illustrative and explanatory thereof, and various changes in the components, construction and technique of operation may be made without departing from the spirit and scope of the claims appended herein.

What is claimed is:

1. A packing element comprising:
    a first plurality of perimeter rods connected to form a first polygon, wherein at least one first rib is connected to two sides of the first polygon to form a first segment;
    a second plurality of perimeter rods connected to form a second polygon, wherein at least one second rib is connected to two sides of the second polygon to form a second segment;
    a connector connected to the first segment and to the second segment to enable folding of the first segment and the second segment to make the packing element; and
    at least one drip point positioned within the packing element.

2. A packing element as in claim 1, wherein the packing element defines apertures.

3. A packing element as in claim 1, wherein the first plurality of perimeter rods have circular cross-section.

4. A packing element as in claim 1, wherein the first plurality of perimeter rods have elliptical cross-section.

5. A packing element as in claim 1, wherein the first plurality of perimeter rods have polygonal cross-section.

6. A packing element as in claim 1, wherein the at least one first rib comprises a first plurality of ribs each connecting to two sides of the first polygon.

7. A packing element as in claim 6, wherein the first plurality of ribs forms a mesh structure.

8. A packing element as in claim 1, wherein the at least one second rib comprises a second plurality of ribs each connecting to two sides of the second polygon.

9. A packing element as in claim 1, wherein the first plurality of ribs further comprises at least one drip point.

10. A packing element as in claim 1, wherein the at least one drip point is integral to the first plurality of ribs.

11. A packing element as in claim 1, wherein the second plurality of perimeter rods have circular cross-section.

12. A packing element as in claim 1, wherein the second plurality of perimeter rods have elliptical cross-section.

13. A packing element as in claim 1, wherein the second plurality of perimeter rods have polygonal cross-section.

14. A packing element as in claim 1, wherein the at least one second rib comprises a second plurality of ribs each connecting to two sides of the second polygon.

15. A packing element as in claim 1, wherein the second plurality of ribs forms a mesh structure.

16. A packing element as in claim 14, wherein the second plurality of ribs further comprises at least one drip point.

17. A packing element as in claim 16, wherein the at least one drip point is integral to the second plurality of ribs.

18. A packing element as in claim 1, wherein the second segment is of smaller dimensions than the first segment such that when the second segment is folded on the first segment, the packing element comprises a tapering structure.

19. A packing element as in claim 1, wherein the first segment and the second segment are spaced apart by a plurality of cross-ribs.

20. A packing element as in claim 1, wherein the first segment further comprises a first sub-polygon that is congruent to the first polygon and is connected to the first polygon by a plurality of cross-ribs.

21. A packing element as in claim 1, wherein the second segment further comprises a second sub-polygon that is congruent to the second polygon and is connected to the second polygon by a plurality of cross-ribs.

22. A system comprising:
a column; and
at least one packing element packed in the column, wherein the packing element comprises:
a first plurality of perimeter rods connected to form a first polygon, wherein at least one first rib is connected to two sides of the first polygon to form a first segment;
a second plurality of perimeter rods connected to form a second polygon, wherein at least one second rib is connected to two sides of the second polygon to form a second segment;
a connector connected to the first segment and to the second segment to enable folding of the first segment and the second segment to make the packing element; and
at least one drip point positioned within the packing element.

23. A packing element as in claim 22, wherein the packing element defines apertures.

24. A packing element as in claim 22, wherein the first plurality of perimeter rods have circular cross-section.

25. A packing element as in claim 22, wherein the first plurality of perimeter rods have elliptical cross-section.

26. A packing element as in claim 22, wherein the first plurality of perimeter rods have polygonal cross-section.

27. A packing element as in claim 22, wherein the at least one first rib comprises a first plurality of ribs each connecting to two sides of the first polygon.

28. A packing element as in claim 27, wherein the first plurality of ribs forms a mesh structure.

29. A packing element as in claim 22, wherein the at least one second rib comprises a second plurality of ribs each connecting to two sides of the second polygon.

30. A packing element as in claim 27, wherein the first plurality of ribs further comprises at least one drip point.

31. A packing element as in claim 30, wherein the at least one drip point is integral to the first plurality of ribs.

32. A packing element as in claim 22, wherein the second plurality of perimeter rods have circular cross-section.

33. A packing element as in claim 22, wherein the second plurality of perimeter rods have elliptical cross-section.

34. A packing element as in claim 22, wherein the second plurality of perimeter rods have polygonal cross-section.

35. A packing element as in claim 22, wherein the at least one second rib comprises a second plurality of ribs each connecting to two sides of the second polygon.

36. A packing element as in claim 35, wherein the second plurality of ribs forms a mesh structure.

37. A packing element as in claim 35, wherein the second plurality of ribs further comprises at least one drip point.

38. A packing element as in claim 37, wherein the at least one drip point is integral to the second plurality of ribs.

39. A packing element as in claim 22, wherein the second segment is of smaller dimensions than the first segment such that when the second segment is folded on the first segment, the packing element comprises a tapering structure.

40. A packing element as in claim 22, wherein the first segment and the second segment are spaced apart by a plurality of cross-ribs.

41. A packing element as in claim 22, wherein the first segment further comprises a first sub-polygon that is congruent to the first polygon and is connected to the first polygon by a plurality of cross-ribs.

42. A packing element as in claim 22, wherein the second segment further comprises a second sub-polygon that is congruent to the second polygon and is connected to the second polygon by a plurality of cross-ribs.

* * * * *